United States Patent [19]
Holleck

[11] 4,127,703
[45] Nov. 28, 1978

[54] NICKEL-HYDROGEN SECONDARY BATTERY

[75] Inventor: Gerhard L. Holleck, Wayland, Mass.

[73] Assignee: EIC Corporation, Newton, Mass.

[21] Appl. No.: 894,720

[22] Filed: Apr. 10, 1978

Related U.S. Application Data

[63] Continuation of Ser. No. 655,498, Feb. 5, 1976, abandoned.

[51] Int. Cl.[2] .......................................... H01M 10/34
[52] U.S. Cl. ....................................... 429/57; 429/72; 429/101; 429/423
[58] Field of Search ..................... 429/57, 72, 223, 101

[56] References Cited

U.S. PATENT DOCUMENTS

| | | | |
|---|---|---|---|
| 3,226,260 | 12/1965 | Drengler | 429/136 |
| 3,333,986 | 8/1967 | Chreitzberg et al. | 429/81 |
| 3,356,533 | 12/1967 | Carson, Jr. | 429/55 |
| 3,410,726 | 11/1968 | Harivel | 429/59 |
| 3,457,112 | 7/1969 | Reber | 429/58 |
| 3,764,387 | 10/1973 | Stark | 429/145 |
| 3,867,199 | 2/1975 | Dunlop et al. | 429/101 |

*Primary Examiner*—Charles F. Lefevour
*Attorney, Agent, or Firm*—Schiller & Pandiscio

[57] ABSTRACT

Storage battery with multi-cell arrays comprising in each cell a positive nickel electrode (cathode) spaced from a hydrogen containing negative electrode (anode) and alkaline electrolyte medium extending between the electrodes and further comprising a reservoir outside the space defined between electrodes to provide buffer storage of electrolyte displaced by gases generated in the course of cell operation, particularly during overcharging, one or more hydrophobic, microporous membranes to prevent electrolyte loss by entrainment in such evolved gases, and an arrangement of cell construction to provide recombination of free oxygen with hydrogen under safe conditions.

18 Claims, 3 Drawing Figures

NICKEL-HYDROGEN SECONDARY BATTERY

This application is a continuation of Ser. No. 655,498 filed Feb. 5, 1976, now abandoned.

BACKGROUND OF THE INVENTION

The present invention relates in general to alkaline storage batteries and more particularly to nickel-hydrogen storage batteries and it utilizes the high energy and power densities of the nickel-hydrogen electrochemical pair in a practical construction affording improved protection against the failure modes of burnout, drying and explosion to provide reliable, long life operation of such cells consistent with high performance.

Nickel-hydrogen secondary batteries known to the art comprise multi-cell arrays within a pressure vessel. Each cell has a positive (during discharge), nickel-containing electrode, consistently designated as, "cathode" herein, spaced from a hydrogen-containing negative (during discharge) electrode consistently designated as "anode" herein. The electrodes generally have the form of spaced plates separated by a porous inert sheet, such as polypropylene or nylon, which acts as a separator matrix for electrolyte extending between the two electrodes. The separator matrix sheet is sufficiently thick to prevent short circuit contact between the electrodes and holds a sufficient quantity of electrolyte for desired cell performance. The electrolyte is an alkaline medium, preferably an aqueous solution of alkali metal hydroxide, more particularly thirty percent potassium hydroxide solution. The hydrogen-containing electrode is a plastic bonded, metal powder plate. The metal is preferably platinum, but may comprise other materials which will catalyze hydrogen oxidation reactions in aqueous electrolyte media and is backed by a plastic, preferably tetrafluoroethylene (e.g., Dupont's Teflon brand materials), mesh element which accommodates gas diffusion. The cathode material is a nickel-oxy-hydroxide. Pairs of such cells are generally arrayed with their cathodes back to back. External contact to the electrodes is generally made by nickel Hydrogen within the pressure vessel, generally maintained at superatmospheric pressure of 20–50 atmospheres, diffuses through the gas diffusion mesh of Teflon or the like to reach the catalytic anode where the discharge mode anode reaction, (I) ½ H$_2$ + OH$^-$ → H$_2$O + e$^-$ occurs, in balance with the corresponding cathode reaction, (II) NiOOH + H$_2$O + e$^-$ → Ni(OH)$_2$ + OH$^-$ providing an overall discharge reaction, (III) NiOOH + ½ H$_2$ → Ni(OH)$_2$ The reverse of such reactions occur on charging. The charge and discharge conditions, cell constructions and operating data are more particularly described in the published article by Giner and Dunlop, "The Sealed Nickel-Hydrogen Secondary Cell" Journal of the Electrochemical Society, Volume 122, number 1, pages 1–11 (January 1975), incorporated herein by reference. The system is an attractive one to workers in the field because of several favorable properties including improved energy density and power density compared to many other electrochemical couples, including nickel-cadmium.

It is an important object of the invention to improve the resistance of nickel-hydrogen batteries to one or more of the failure modes of burnout, drying and explosion.

It is a further object of the invention to maintain high performance of such batteries in terms of energy and power density consistent with the preceding object.

It is a further object of the invention to make only minimal changes in weight and volumetric envelope considerations applicable to such batteries consistent with one or more of the preceding objects.

It is a further object of the invention to stabilize the conditions of cyclic charge and discharge consistent with one or more of the preceding objects.

SUMMARY OF THE INVENTION

In accordance with the invention, nickel-hydrogen batteries are constructed to provide safe pathways for evolved oxygen to move to sites where it can recombine with hydrogen at a safe rate and in a saft manner. Such constructions also embody buffering means in the form of a reservoir for taking up electrolyte removed from its normal location in and between electrodes through displacement and/or entrainment, by evolved gases and to allow return of such electrolyte to such normal location. Such reservoirs are built into each cell of a cell stack array within a battery and each such reservoir has a hydrophobic microporous membrane covering to prevent electrolyte loss from the cell. The weight and volumetric additions inherent in the use of reservoirs and microporous membranes are offset through higher efficiency in cell operation, and/or reduction of necessary separator thickness and, in any event, the weight and volume of such added components are only a small fraction of overall weight and volume of the battery, including the pressure vessel and the volume change is accommodated within existing pressure vessel designs.

Other objects, features and advantages of the invention will be apparent from the following detailed description of preferred embodiments, taken in connection with the accompanying drawing, in which:

DETAILED DESCRIPTION OF PREFERRED EMBODIMENTS

Figure 1:
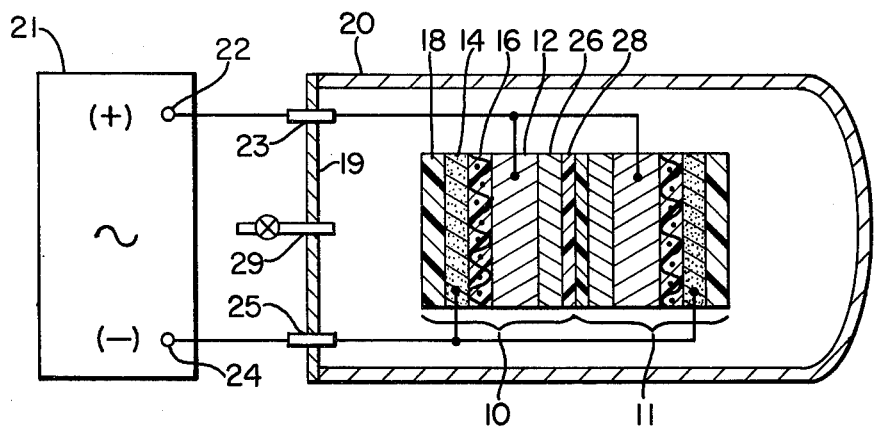
FIG. 1 is a cross-section view of a secondary battery made in accordance with a first embodiment of the invention.

Referring now to FIG. 1, there is shown a first embodiment of the secondary battery of the invention wherein the unit cell 10 of an array of cells comprises a positive plate (during discharge) cathode 12, opposing an anode 14 and separated by a porous inert sheet (separator matrix) 16. The plate 12 is preferably a sintered nickel structure, impregnated with the electroactive material, commonly characterized by the formula, NiOOH, and has a form and thickness commonly used both in nickel-cadmium batteries and in state-of-the-art nickel-hydrogen batteries. The anode 14 is made of Teflon-bonded platinum powders on a current carrying nickel support screen to provide good conductivity. Adjacent to the anode is a plastic mesh 18 which provides a gas space allowing easy diffusion of hydrogen between the anode 14 and the surrounding atmosphere. The surrounding atmosphere is a superatmosphere defined by a pressure vessel 20 containing superatmospheric pressure of hydrogen, on the order of 20–30 atmospheres. The cathode and anode 12 and 14, respectively, are connected to plus and minus terminals 22 and 24, respectively, of a load circuit 21 via feed-throughs 23 and 25 in cover 19 of the pressure vessel. In contact with the nickel oxi-hydroxide cathode 12 is a reservoir matrix 26 may be of porous organic or inorganic material including ceramics and porous metal structures. The reservoir 26 is backed by a membrane 28 which is made of a microporous hydrophobic material which allows passage of gas and vapor but is impermeable to liquid electrolyte. This membrane 28 can also consist of a non-porous material if gas passages are provided through the separator matrix 16, e.g. by the use of a material with dual pore sizes (e.g. Nylon) or with hydrophilic and hydrophobic pores (e.g. Teflon bonded potassium titanate or zirconia).

There are several of such cells in array within the battery, only two of which are indicated in the drawing, and designated as 10 and 11. The cells are arranged with their positive electrodes (12) back-to-back and preferably, the total number of such cells is built up in even number multiples.

The operation of the battery is in accordance with the general anode, cathode and overall reactions described above in connection with prior art nickel-hydrogen batteries.

Figure 2:
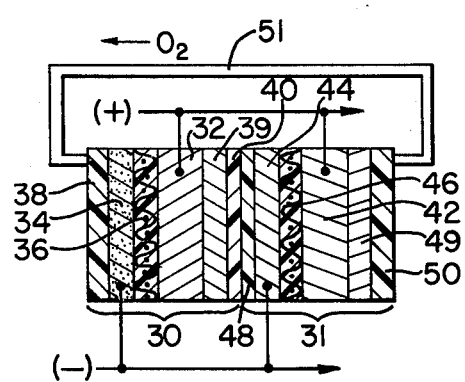
FIGS. 2 and 3 are cross-section views of portions of second and third embodiments of the invention, all parts not shown being identical to corresponding parts of the FIG. 1 embodiment.

Further embodiments of the invention are illustrated in FIG. 2 wherein unit cells 30 and 31 are shown with single positives, i.e. the reverse of back-to-back arrangement. The cell 30 comprises cathode 32, anode 34, a separator matrix 36, a gas space defining backing sheet 38, a reservoir structure 39 and a membrane 40. Unit cell 31 comprises cathode 42, anode 44, separator matrix 46, gas space defining sheet 48, reservoir structure 49 and membrane 50. During the later phases of charge and especially on overcharge oxygen gas is evolved at the nickel oxide electrode 32. If the electrolyte matrix 36 is practically impermeable to gas, the oxygen will migrate through the reservoir structure 39 and the membrane 40, diffuse across the gas space 48 and safely react at the anode 44 with hydrogen to form water. Since, with reference to FIG. 2, the movement of oxygen from left to right leads to a movement of water from left to right, a return conduit 51 for oxygen is provided to avoid asymmetric buildup of water.

In all the above described embodiments, electrolyte displaced from within the electrolyte containing cathode by gas evolution is accommodated in the reservoirs. When gas evolution ceases after termination of the charging process, the displaced electrolyte will return to the cathode. Since the separator matrix plates do not have to assume a reservoir function, they can be as thin as possible, limited only by considerations of avoiding short circuit contact between anode and cathode. Also, maximum cell performance is achieved since, during discharge, the electrodes and the separator matrix operate in the preferred fully electrolyte saturated state.

For example, a cell stack unit may consist of approximately circular components about 3.5 inches in diameter which include a ~30 mil sinter plaque nickel oxide electrode (cathode). a ~5 mil Teflon bonded platinum gas electrode with, e.g., 5 to 10 mg Pt/cm$^2$ (anode), a ~10 mil asbestos separator, a ~10 mil thick nonwoven nylon or polypropylene matrix as reservoir, a ~4 mil microporous Teflon membrane, and a ~20 mil high woven polypropylene gas distribution screen. These components are simply stacked on top of each other in the proper sequence.

A variety of available materials can be substituted for the separator, the reservoir, the cover membrane and the gas distribution screen. The main criteria, besides compatibility with the cell environment (KOH, $H_2$, $O_2$), are pore size and pore size distribution. The reservoir has to have a larger average pore size than the nickel plate (cathode) and the separator in order to transfer its electrolyte to the latter two components. Specifically, the separator may consist of asbestos potassium titanate fibers or zirconia fibers. The reservoir may consist of organic fiber matrices (nonwoven nylon, polypropylene, Dynel), of inorganic porous structures (zirconia, potassium titanate), or of porous metallic matrices (porous nickel sinter or felt). The cover membrane has to be hydrophobic and an insulator. For example, it may be of porous Teflon or porous polypropylene. The function of the gas distribution screen is to provide access of the hydrogen gas in the pressure vessel to the anode. Nickel or plastic screens are suitable.

Figure 3:
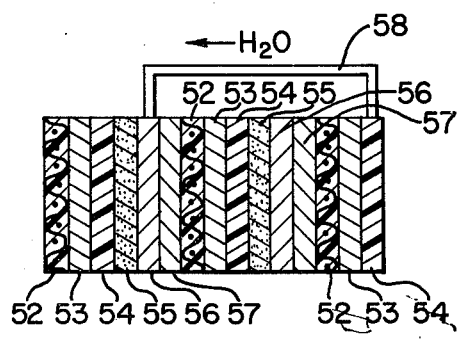

The continuing concentration and dilution of electrolyte at opposite ends of an array of unit cells with single positives (FIG. 2) can be prevented by several practical arrangements. For example, a tubular conduit for oxygen gas can be provided between the ends of the cell array. Practical implementation is facilitated by the absence of a pressure difference between the interior and the exterior of the conduit. Also, hermeticity is not required. Alternatively, the cell stack can terminate with a catalyst electrode such as used for the anode. In this case, the oxygen will react with the hydrogen environment at the catalyst to yield water which will dilute the electrolyte. The excess water can be returned via a conduit, e.g. wick, to the opposite end of the cell array. The same types of materials that are suitable as reservoir structures can also be used for wick arrangements. This configuration is schematically shown in FIG. 3. It shows the array of the following components: gas distribution screen 52, anode 53, separator matrix 54, cathode 55, reservoir structure 56, cover membrane 57 and wick for water return 58.

If the Ni/$H_2$ cell is operated only under mild conditions (low rate, limited amount of overcharge), a special oxygen or water return conduit need not be provided at all since the common hydrogen atmosphere acts as such. For example, the more dilute electrolyte has an increased partial pressure of water vapor, thus water will evaporate and recondense at the location of higher electrolyte concentration. Only if operating conditions of nickel-hydrogen batteries are such that the rate of this mechanism is insufficient is an oxygen or water return conduit necessary to guarantee stable long term operation.

It is an advantage of this invention that it can be implemented with a minimum of change in present nickel-hydrogen battery designs. Electrical performance characteristics of the embodiments described above are essentially the same as those of present state-of-the-art nickel-hydrogen cells. The discharge capacity of identical cathodes will be approximately 10% greater if used in accordance with this invention. However, through the present invention in extended cycling (many thousand cycles) the high initial performance exhibited by nickel-hydrogen batteries is preserved in contrast to the case with conventially designed cells which are subject to failure either suddenly or by performance degradation (lower voltage and capacity) during extended cycling.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. In a nickel-hydrogen secondary battery comprising a single or multi-cell array with each cell made up of at least a nickel oxi-hydroxide cathode plate, a hydrogen anode plate a separator containing a liquid electrolyte disposed between and extending from the anode plate to the cathode plate, and a hydrogen ambient atmosphere which is accessible to the anode plate, so that said electrolyte provides a conductive path between said cathode and anode plates and energy conversion is effected through charge and discharge in accordance with the simplified reversible overall equation, $$NiOOH + \tfrac{1}{2} H_2 \rightleftarrows Ni(OH)_2$$

the improvement comprising
means defining an oxygen return path between the ends of each cell to prevent an asymmetric buildup of oxygen produced during charging said oxygen recombining with hydrogen.

2. The improved secondary battery of claim 1 wherein the cells of an array are arranged with single positives (cathodes) such as to allow part or all of the oxygen generated at the cathode of one cell to reach the anode of the following cell unit by diffusion.

3. In a nickel-hydrogen battery which is capable of being charged and discharged in accordance with the simplified overall reversible reaction equation $$NiOOH + \tfrac{1}{2}H_2 \rightleftarrows Ni(OH)_2$$

and which comprises at least two unit cells with each cell comprising a nickel oxi-hydroxide cathode plate having first and second opposite sides, a hydrogen anode plate having first and second opposite sides, separator means containing a liquid electrolyte extending between the first side of said cathode plate and the first side of said anode plate so as to provide a conductive path therebetween, and a porous gas-distributor means located adjacent to the second side of said anode plate for conducting an ambient hydrogen atmosphere to said anode plate;
the improvement comprising means defining a reservoir for receiving electrolyte which is displaced from within each cell as a result of gas evolution and for returning said electrolyte to said each cell, said reservoir-defining means comprising a porous member disposed in engaging relation with the second side of said cathode plate and non-engaging relation with any anode plate in said battery.

4. An improved battery according to claim 3 wherein said cells are disposed so that a cathode plate of one cell is in back-to-back relation with a cathode plate of another cell, and said reservoir-defining means extends between said back-to-back cathode plates.

5. An improved battery according to claim 4 wherein said reservoir-defining means comprises two porous members located between said back-to-back cathode plates, and further including at least one membrane separating said porous members.

6. An improved battery according to claim 5 wherein said membrane is gas permeable.

7. An improved battery according to claim 6 wherein said membrane is a microporous hydrophobic material.

8. An improved battery according to claim 5 having at least two membranes separating said porous members.

9. An improved battery according to claim 3 wherein said cells are in a stacked array, with said reservoir-defining means comprising a separate porous member for each cell.

10. An improved battery according to claim 3 wherein said separator means and said reservoir-defining means comprise porous members with the pores of said reservoir-defining means having a larger average size than the pores of said separator means.

11. An improved battery according to claim 3 wherein said cells are arranged in a stack, and further including means providing a path for equilibrating electrolyte liquid between the ends of each cell to prevent imbalance of accumulating water generated by reaction of oxygen with hydrogen.

12. In a nickel-hydrogen battery which is capable of being charged and discharged in accordance with the simplified overall reversible reaction equation $$NiOOH + \tfrac{1}{2}H_2 \rightleftarrows Ni(OH)_2$$

and which comprises one or more nickel oxi-hydroxide cathode plates and one or more anode plates each having first and second sides, separator means containing a liquid electrolyte extending between the first side of each cathode plate and the first side of each anode plate that is adajcent to each said cathode plate so as to provide a conductive path therebetween, and porous gas-distributor means located adjacent to the second side of each anode plate for conducting an ambient hydrogen atmosphere to each anode plate;
the improvement comprising means defining a reservoir for receiving electrolyte which is displaced from its normal location in each cathode plate and each separator means as a result of gas evolution and for returning said electrolyte to said normal location, said reservoir-defining means being porous and disposed in engaging relation with the second side of each cathode plate and non-engaging relation with any anode plate and any separator means.

13. An improved battery according to claim 12 comprising at least two unit cells each having a nickel oxy-hydroxide cathode plate, an anode plate and an electrolyte-containing separator means extending between its said cathode and anode plates, said cells being disposed so that a cathode plate of one cell is in back-to-back relation with a cathode plate of the other cell, and said reservoir-defining means extends between said back-to-back cathode plates.

14. An improved battery according to claim 13 wherein said reservoir-defining means comprises two porous members located between said back-to-back cathode plates, and further including at least one membrane separating said porous members.

15. An improved battery according to claim 12 comprising at least first and second unit cells with each cell having a nickel oxy-hydroxide cathode plate, an anode plate, an electrolyte-containing separator means between its said cathode and anode plates, a separate reservoir-defining means in the form of a porous member, and a separate gas distributor means, said cells being arranged with their components stacked together in the following order:

first cell gas distributor means, first cell anode plate, first cell separator means, first cell cathode plate, first cell reservoir means, second cell gas distributor means, second cell anode plate, second cell separator means, second cell cathode plate, and second cell reservoir means.

16. An improved battery according to claim 15 wherein said first cell also comprises a gas-porous, electrolyte-impermeable membrane located between said first cell reservoir means and said second cell gas distributor means.

17. An improved nickel-hydrogen battery which is capable of being charged and discharged in accordance with the simplified overall reversible reaction represented by the equation

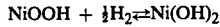

and which comprises at least two unit cells each having a nickel oxi-hydroxide cathode plate, a hydrogen-containing anode plate, and a separator containing an aqueous liquid electrolyte extending between said cathode and anode plates, said cells being arranged in a stack with their cathode and anode plates arranged in the same order, and means extending lengthwise of the stack for providing a predetermined path for retrieving electrolyte liquid accumulating in one cell in the stack and transferring it to another cell in the same stack so as to prevent imbalance of accumulating water generated by reaction of oxygen with hydrogen.

18. In a nickel-hydrogen battery which is capable of being charged and discharged in accordance with the simplified overall reversible reaction equation

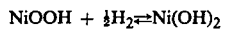

and which comprises at least two unit cells arranged in a stack with each cell comprising a nickel oxi-hydroxide cathode plate, a hydrogen anode plate, separator means containing a liquid electrolyte extending between said cathode plate and said anode plate so as to provide a conductive path therebetween, and a porous gas-distributor means located adjacent to said anode plate for conducting an ambient hydrogen atmosphere to said anode plate;

the improvement comprising means defining a reservoir for receiving electrolyte which is displaced from within each cell as a result of gas evolution and for returning said electrolyte to said each cell, said reservoir-defining means being porous and disposed in engaging relation with each cathode plate and non-engaging relation with any anode plate, and means providing an oxygen return path between the ends of the cells to prevent imbalance of accummulating oxygen in the cells said oxygen recombining with hydrogen.

* * * * *